United States Patent [19]

Endo et al.

[11] Patent Number: 4,876,631
[45] Date of Patent: Oct. 24, 1989

[54] ELECTRIC DOUBLE LAYER CAPACITOR

[75] Inventors: Masanori Endo; Kouichi Watanabe, both of Kyoto, Japan

[73] Assignee: Murata manufacturing Co., Ltd., Japan

[21] Appl. No.: 308,111

[22] Filed: Feb. 8, 1989

[30] Foreign Application Priority Data

Feb. 9, 1988 [JP] Japan .................. 63-28125

[51] Int. Cl.⁴ .............................................. H01G 9/00
[52] U.S. Cl. .................................................... 361/502
[58] Field of Search .......................................... 361/502

[56] References Cited

FOREIGN PATENT DOCUMENTS 55-104910 8/1980 Japan .

Primary Examiner—Donald A. Griffin
Attorney, Agent, or Firm—Ostrolenk, Faber, Gerb & Soffen

[57] ABSTRACT

An electric double layer capacitor utilizing an electric double layer formed at the interface between activated carbon electrodes and electrolyte included in polarizable electrodes, wherein the activated carbon electrodes are made from activated carbon which is produced by subjecting a synthetic resin, such as polyacrylonitrile or cellulose, to flame resisting treatment and activating treatment and which contains a Ti compound whose amount is not more than 0.2 wt % in terms of Ti.

4 Claims, 1 Drawing Sheet

ELECTRIC DOUBLE LAYER CAPACITOR

BACKGROUND OF THE INVENTION

1. Field of the Invention

The present invention relates to improvements in an electric double layer capacitor, particularly in activated carbon which forms activated carbon electrodes included in polarizable electrodes.

2. Description of the Background Art

Generally, an electric double layer capacitor has an electric double layer formed at the surface of separation or interface between activated carbon electrodes and electrolyte included in polarizable electrodes, and electric charge is stored in said electric double layer. The activated carbon used for activated carbon electrodes is produced by carbonizing and activating vegetable materials (wood, wood flour, coconut shell, lignin, pulp waste water, etc.), mineral materials (coal, coke, pitch, etc.) or synthetic resins (phenol, polyacrylonitrile, cellulose, vinyl chloride, etc.).

In said electric double layer capacitor using activated carbon electrodes made of activated carbon obtained from vegetable or mineral materials, since activated carbon contains a large amount of ash, there is a drawback that the voltage retaining characteristic is poor.

Activated carbon obtained from synthetic resins contains almost no ash. In this case, in producing activated carbon the ease with which the pyrolyzed gas and activating gas diffuse must be taken into consideration, and in this respect it has been found that fibrous resins are suitable. Synthetic resins from which activated carbon is made are broadly classified into two types, one having no melting or softening point and the other exhibiting depolymerization and melting. Fibrous activated carbon from the former type is made from thermosetting resins, such as phenol resin, while fibrous activated carbon from the latter type is made from polyacrylonitrile and cellulose. When the two types are compared, it is seen that the polyacrylonitrile and cellulose series of the latter type are superior.

In the latter, it is necessary to effect flame resisting treatment by heat treatment in an oxidized atmosphere at 200°–400° C. prior to carbonization, and in order to reduce the oxidizing time involved therein, it is common practice to use compounds containing the group IV elements in the periodic table, particularly $TiO_2$ (for example, Japanese Patent Application Laid-Open Specification No. 104910/1980). However, in that case, $TiO_2$ remains in the activated carbon. If more than a certain amount of $TiO_2$ remains in the activated carbon, Ti takes part in electrolysis, resulting in unignorable reaction current, which deteriorates the voltage retaining characteristic of the electric double layer capacitor.

In addition, the flame resisting treatment, which is a preparatory processing step in the production of fibrous activated carbon, is sometimes called infusibility treatment, thermal stabilization treatment or oxidation treatment.

SUMMARY OF THE INVENTION

An object of the present invention is to provide an electric double layer capacitor which is superior in voltage retaining characteristic.

The present invention is directed to an electric double layer capacitor utilizing an electric double layer which is formed at the interface between activated carbon electrodes and electrolyte included in polarizable electrodes, the invention being characterized in that said activated carbon electrodes are made of activated carbon which is produced by subjecting a synthetic resin to flame resisting treatment and activating treatment and which contains a Ti compound whose amount is not more than 0.2 wt % in terms of Ti.

In addition, as for synthetic resins, use is made, for example, of polyacrylonitrile or cellulose. Further, said synthetic resins are in the form of powder, fiber, non-woven fabric or woven fabric, but are preferably fibrous.

In an electric double layer capacitor according to the present invention, since the activated carbon electrodes are made of activated carbon from synthetic resin, they contain no ash or almost no ash. Further, since the amount of Ti compound in said activated carbon electrodes is not more than 0.2 wt % in terms of Ti, there is no problem of a reaction current flowing to deteriorate the voltage retaining characteristic of the electric double layer capacitor.

Therefore, according to the invention, an electric double layer capacitor which is superior in voltage retaining characteristic can be realized.

DESCRIPTION OF THE PREFERRED EMBODIMENTS

Figure 1:
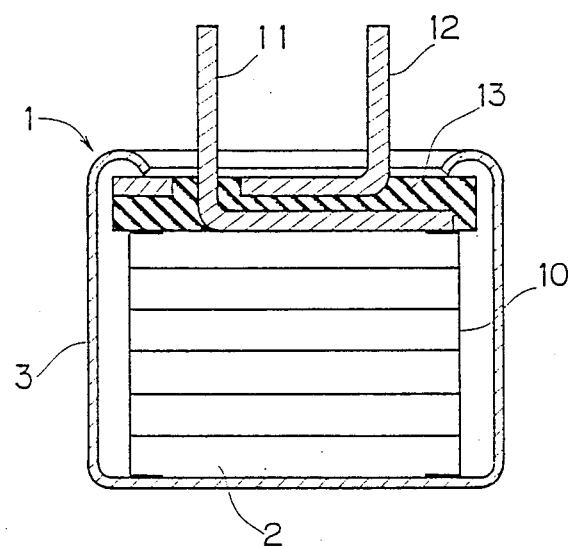
FIG. 1 is a longitudinal sectional view of an electric double layer capacitor.
Figure 2:
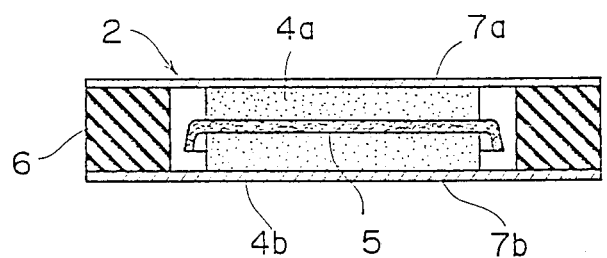
FIG. 2 is a capacitor cell included in the electric double layer capacitor shown in FIG. 1.

In FIG. 1, the six disk-like capacitor cells 2 of an electric double layer capacitor 1 are concentrically stacked and housed in a cup-like case 3. As shown in FIG. 2, each cell 2 comprises a pair of polarizable electrodes 4a and 4b, a separator 5, an annular gasket 6, and a pair of current collectors 7a and 7b thermally bonded to the upper and lower surfaces of the gasket 6.

The polarizable electrodes 4a and 4b are disposed in the center of the space defined by the gasket 6 and are separated from each other by the separator 5. The polarizable electrodes 4a and 4b are provided with activated carbon electrodes produced by subjecting a synthetic resin to flame resisting treatment and activating treatment. The separator 5 is produced of a porous film or non-woven fabric of polyolefin and is preferably formed with a raised portion around its peripheral edge. This raised portion surrounds one polarizable electrode 4b, thereby preventing the polarizable electrodes 4a and 4b from peripherally short-circuiting each other. The separator 5 and the activated carbon electrodes of polarizable electrodes 4a and 4b are impregnated with an electrolyte, such as a 50 wt % aqueous solution of sulfuric acid.

The cells 2 constructed in the manner described above are stacked as shown in FIG. 1 and combined together from the periphery by a thermally shrinkable insulating tube 10 and then received in the case 3 in pressurized condition. In addition, the numerals 11 and 12 denote metal plates integrally formed with projecting terminals and combined together through an insulating plate 13. The metal plate 11 is electrically connected to the upper end surface of the uppermost cell 2. The metal plate 12 abuts against the case 3 and is electrically connected to the lowermost cell 2 through the case 3.

More concrete experimental examples will now be described.

EXPERIMENTAL EXAMPLE 1

Spinning solutions were prepared by respectively adding no amount (Embodiment 1), a smaller amount (Embodiment 2) and a larger amount (Comparative Example 1) of $TiO_2$ to polyacrylonitrile copolymerization solution containing 91.0 wt % acrylonitrile and 9.0 wt % methyl acrylate. These spinning solutions were spun to provide three kinds of polyacrylonitrile based fibers. These fibers were subjected to flame resisting treatment and activating treatment to provide three kinds of fibrous activated carbon.

Each of the three kinds of activated carbon was subjected to the following treatments: First, the fibrous activated carbon obtained was pulverized. 80 parts by weight of activated carbon which had passed through a 200 mesh screen was dispersed in water, and 20 parts by weight of artificial latex made from chlorosulfonated polyethylene was added thereto, followed by sufficient stirring for mixing. The moisture was then removed from the mixed solution to provide coagulated mixture. This mixture was crushed and granulated. The granules obtained were pressed by a press machine to provide compacts. The compacts obtained were impregnated with an aqueous solution of sulfuric acid (50 wt %) to provide polarizable electrodes.

The voltage retaining characteristics of electric double layer capacitors obtained in this manner are shown in Table 1.

Pulverized activated carbon from a wood flour charcoal was used in the same manner as above to produce an electric double layer capacitor, whose voltage retaining characteristic is also shown as a conventional example in Table 1.

TABLE 1

|  | Use of $TiO_2$ | Ash (wt %) Ti | Ash (wt %) Others | Voltage retaining characteristic (V) |
|---|---|---|---|---|
| Embodiment 1 | No | 0 | 0.1 | 4.2 |
| Embodiment 2 | Yes | 0.2 | 0.1 | 4.1 |
| Comparative example 1 | Yes | 0.5 | 0.1 | 3.5 |
| Conventional example | — | 0.2 | 4.5 | 3.0 |

As is obvious from Table 1, the ash content of polyacrylonitrile based activated carbon is less than in the case of using the conventional wood flour charcoal as a material. As a result, the voltage retaining characteristics of the embodiments 1 and 2 and Comparative Example 1 using polyacrylonitrile based activated carbon for activated carbon electrodes are improved as compared with the conventional example. Further, in the embodiments 1 and 2 of the present invention, as compared with the Comparative Example 1 in which the Ti content is 0.5 wt %, the voltage retaining characteristic is improved.

EXPERIMENTAL EXAMPLE 2

Two types of cellulose fibers, one having $TiO_2$ added thereto (Comparative Example 2) and the other having no $TiO_2$ added thereto (embodiments 3), were prepared. These cellulose fibers were then subjected to flame resisting treatment and activating treatment to provide fibrous activated carbons.

The fibrous activated carbons obtained were pulverized to provide electric double layer capacitors in the same manner as in the experimental Example 1.

The voltage retaining characteristics of the electric double layer capacitors thus obtained are shown in Table 2.

TABLE 2

|  | Use of $TiO_2$ | Ash (wt %) Ti | Ash (wt %) Others | Voltage retaining characteristic (V) |
|---|---|---|---|---|
| Embodiment 3 | No | 0 | 0.2 | 4.0 |
| Comparative example 2 | Yes | 1.0 | 0.2 | 3.4 |

As is obvious from Table 2, in the case of the embodiment 3 according to the present invention, the voltage retaining characteristic is improved as compared with the Comparative Example 2 using $TiO_2$.

In addition, in Tables 1 and 2, the voltage retaining characteristic indicates the voltage across terminals when the capacitor is left to stand at 25° C. under no load for 24 hours after it has been charged at 25° C., 5 V for 15 minutes.

What is claimed is:

1. An electric double layer capacitor comprising:
   first and second polarizable electrodes,
   a separator disposed between said first and second polarizable electrodes, and
   first and second current collectors in contact with said first and second polarizable electrodes, and
   each of said first and second polarizable electrodes comprising an activated carbon electrode which is made from activated carbon obtained by subjecting a synthetic resin to flame resisting treatment and activating treatment and which contains a titanium compound whose amount is between 0 and 0.2 wt % in terms of Ti, and electrolyte.

2. An electric double layer capacitor as set forth in claim 1, wherein said synthetic resin is polyacrylonitrile.

3. An electric double layer capacitor as set forth in claim 1, wherein said synthetic resin is cellulose.

4. An electric double layer capacitor as set forth in claim 1, wherein said synthetic resin is in the form of fiber.

* * * * *